US009752942B2

(12) United States Patent
Jolly et al.

(10) Patent No.: US 9,752,942 B2
(45) Date of Patent: Sep. 5, 2017

(54) TORQUEMETER WITH IMPROVED ACCURACY AND METHOD OF USE

(71) Applicant: LORD Corporation, Cary, NC (US)

(72) Inventors: Mark R. Jolly, Raleigh, NC (US); Russell E. Altieri, Holly Springs, NC (US); Charles J. Allred, Shelburne, VT (US); Michael Hamel, Essex Junction, VT (US); Stephen C. Southward, Blacksburg, VA (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 14/897,129

(22) PCT Filed: Jun. 27, 2014

(86) PCT No.: PCT/US2014/044688
§ 371 (c)(1),
(2) Date: Dec. 9, 2015

(87) PCT Pub. No.: WO2014/210524
PCT Pub. Date: Dec. 31, 2014

(65) Prior Publication Data
US 2016/0123821 A1    May 5, 2016

Related U.S. Application Data

(60) Provisional application No. 61/840,887, filed on Jun. 28, 2013.

(51) Int. Cl.
*G01L 3/00* (2006.01)
*G01L 3/10* (2006.01)
*G01L 25/00* (2006.01)

(52) U.S. Cl.
CPC ............ *G01L 3/10* (2013.01); *G01L 3/101* (2013.01); *G01L 3/109* (2013.01); *G01L 25/003* (2013.01)

(58) Field of Classification Search
CPC . G01L 3/101; G01L 3/109; G01L 3/10; G01L 25/003; G01P 3/488; G01P 3/487
USPC .................... 73/862.331–862.335, 862.329
See application file for complete search history.

(56) References Cited

U.S. PATENT DOCUMENTS

| 3,824,848 A | | 7/1974 | Parkinson | |
|---|---|---|---|---|
| 4,488,443 A | * | 12/1984 | Parkinson | ............... G01L 3/104 73/862.329 |
| 4,881,414 A | * | 11/1989 | Setaka | ..................... B62D 6/10 324/207.18 |
| 4,901,562 A | * | 2/1990 | Beakas | ................... G01P 3/488 324/174 |
| 5,450,761 A | * | 9/1995 | Zilberman | ............. G01L 3/101 73/862.041 |
| 2004/0250631 A1 | * | 12/2004 | Pattok | ..................... G01L 3/101 73/862.331 |
| 2005/0044968 A1 | | 3/2005 | Southward | |

(Continued)

*Primary Examiner* — Max Noori
(74) *Attorney, Agent, or Firm* — Richard G. Miller (57) ABSTRACT

A non-contacting torquemeter capable of measuring torque in a rotating shaft with improved accuracy in the presence of relative motion between a rotating shaft and a transducer assembly is provided. The non-contacting torquemeter has improved robustness and reliability, and is able to self-calibrate. The non-contacting torquemeter is able to provide accurate torque measurements using a single transducer assembly positioned at a single azimuthal position on a rotating shaft.

20 Claims, 5 Drawing Sheets

(56) References Cited

U.S. PATENT DOCUMENTS

| | | | |
|---|---|---|---|
| 2005/0054473 A1* | 3/2005 | Burns | F16H 59/42 |
| | | | 475/257 |
| 2011/0015878 A1 | 1/2011 | Lavigne et al. | |
| 2014/0174201 A1* | 6/2014 | Zhong | G01L 3/104 |
| | | | 73/862.191 |

* cited by examiner

TORQUEMETER WITH IMPROVED ACCURACY AND METHOD OF USE

BACKGROUND OF THE INVENTION

Current non-contacting torquemeters are incapable of measuring torque in rotating shafts with accuracy when there is relative motion between a shaft and a transducer assembly. Furthermore, existing torquemeters lack the ability to self-calibrate, requiring in situ or periodic calibration, and have low overall reliability.

There are existing torque and alignment sensors that can address some of these issues. For example, in one existing configuration, multiple sensors are used to measure the timing of two separate toothed target wheels that provide measurements of three degrees-of-freedom of articulation including measurements of twist and angular misalignment. Such an arrangement can provide nearly unparalleled torque measurement accuracy, as well as alignment measurement. This highly reliable sensor is non-contacting and has minimal impact on shaft dynamics, but such a system requires the use of an array of sensors arranged at multiple positions about the measured shaft, and extensive signal processing is needed used to achieve the torque and alignment measurements.

As a result, it would be desirable for a non-contacting torquemeter to be able to measure torque in a rotating shaft with improved accuracy in the presence of relative motion between a rotating shaft and a transducer assembly. It would further be desirable for such a non-contacting torquemeter to have improved robustness and reliability, and to be able to self-calibrate. In addition, it would be advantageous for the non-contacting torquemeter to be able to provide accurate torque measurements using a single transducer assembly positioned at a single azimuthal position on a rotating shaft.

SUMMARY OF THE INVENTION

In one aspect, the invention provides for a non-contacting torquemeter assembly. The non-contacting torquemeter comprises a torque wheel assembly configured for coupling to a first portion of a rotating shaft for rotation with the rotating shaft, a plurality of dynamic target teeth configured for coupling to a second portion of the rotating shaft for rotation with the rotating shaft, wherein the plurality of dynamic target teeth are configured to deflect with respect to the torque wheel assembly as a function of a torque applied to the rotating shaft. In this aspect, the non-contacting torquemeter further comprises a transducer assembly including at least one sensor separated from the torque wheel assembly by a gap and configured to measure a position and speed of the torque wheel assembly and the plurality of dynamic target teeth. A processing unit is provided in communication with the transducer assembly and configured to determine the torque applied to the rotating shaft based on the position and speed measured by the transducer assembly.

In another aspect, the invention provides for a non-contacting torquemeter. The non-contacting torquemeter comprises a shaft rotatable about an axis and a torque wheel assembly configured for coupling to a first portion of the shaft for rotation with the shaft. In this configuration, the torque wheel assembly comprises a first torque wheel having a plurality of first recessed sections in an outer edge of the first torque wheel, the plurality of first recessed sections being spaced about the perimeter of the first torque wheel; a second torque wheel having a plurality of second recessed sections in an outer edge of the second torque wheel, the plurality of second recessed sections being spaced about the perimeter of the second torque wheel; and a plurality of reference target teeth each positioned within one of the plurality of second recessed sections. A plurality of dynamic target teeth are coupled to a second portion of the shaft for rotation with the shaft, wherein each of the plurality of dynamic target teeth are aligned within one of the plurality of first recessed sections in the first torque wheel, and wherein the plurality of dynamic target teeth are configured to deflect with respect to the first torque wheel as a function of a torque applied to the rotating shaft. A transducer assembly including at least one sensor is separated from one of the first torque wheel or the second torque wheel by a gap and configured to measure a position and speed of the one of the first torque wheel and plurality of dynamic target teeth or the second torque wheel and plurality of reference target teeth. A processing unit is provided in communication with the transducer assembly and configured to determine the torque applied to the shaft based on the position and speed measured by the transducer assembly.

In yet another aspect, a method for measuring a torque on a rotating shaft is provided. The method comprises measuring a position of a dynamic target relative to a torque wheel assembly, wherein the torque wheel assembly is coupled to a first portion of a rotating shaft for rotation with the rotating shaft, wherein the dynamic target is coupled to a second portion of the rotating shaft for rotation with the rotating shaft, and wherein the dynamic target is configured to deflect with respect to the torque wheel assembly as a function of a torque applied to the rotating shaft. Further, the method comprises measuring a position of a reference target that is fixed in rotation with respect to the torque wheel assembly and comparing the position of the dynamic target relative to the torque wheel assembly to the position of the reference target relative to the torque wheel assembly. In addition, the method comprises determining a torque applied to the rotating shaft based on a difference between the position of the dynamic target relative to the torque wheel assembly to the position of the reference target relative to the torque wheel assembly.

Numerous objects and advantages of the invention will become apparent as the following detailed description of the preferred embodiments is read in conjunction with the drawings, which illustrate such embodiments.

DETAILED DESCRIPTION

Figures 1A, 1B:
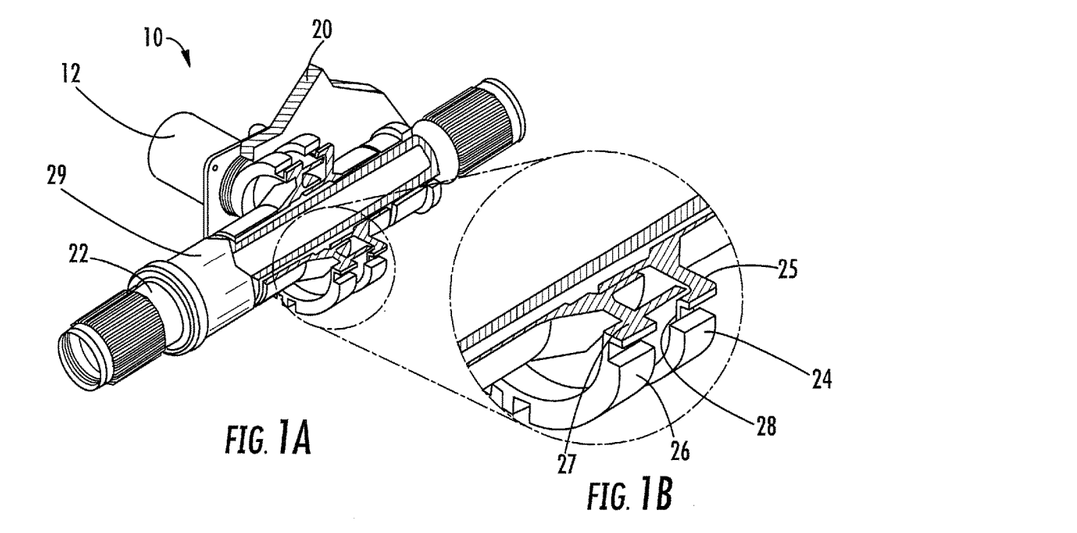
FIGS. 1A and 1B illustrate perspective views of a rotating shaft with two-sets of target teeth according to an embodiment of the present subject matter.

In accordance with this disclosure, a non-contacting torquemeter capable of measuring torque in a rotating shaft with improved accuracy in the presence of relative motion between a rotating shaft and a transducer assembly is provided. The non-contacting torquemeter has improved robustness and reliability, and is able to self-calibrate. The non-contacting torquemeter is able to provide accurate torque measurements using a single transducer assembly positioned at a single azimuthal position on a rotating shaft In one aspect shown in FIG. 1A, for example, an embodiment of a torquemeter assembly, generally designated 10, is illustrated. In this embodiment, a rotating shaft 22 for which torque and alignment measurements are desired is positioned for rotation relative to a support structure 20. As shown in FIG. 1A, for example, in some embodiments, rotating shaft 22 positioned in a case 29. Furthermore, in some embodiments, a torque wheel assembly is coupled to a first portion of rotating shaft 22 for rotation therewith. Specifically, as shown in FIG. 1B, the torque wheel assembly includes a substantially disc-shaped first torque wheel 24 that is arranged substantially coaxially about rotating shaft 22. As shown in FIG. 1B, first torque wheel 24 has a plurality of first recessed sections (e.g., cutouts, indents) in an outer edge thereof, the plurality of first recessed sections being spaced about the perimeter of first torque wheel 24.

Similarly, a substantially disc-shaped second torque wheel 26 is likewise arranged substantially coaxially about rotating shaft 22. As shown in FIGS. 1A and 1B, second torque wheel 26 is spaced axially from first torque wheel 24 such that the two discs are rotatable in parallel next to one another with rotating shaft 22. In an alternative configuration, first torque wheel 24 and second torque wheel 26 can be provided as a single element that spans a comparatively larger axial distance along rotating shaft 22. In any configuration, second torque wheel 26 has a plurality of second recessed sections in an outer edge thereof, the plurality of second recessed sections being spaced about the perimeter of second torque wheel 26. In addition, a plurality of reference target teeth 27 are positioned within the plurality of second recesses such that they each have a fixed angular spacing relative to the outer edge of second torque wheel 26 surrounding the respective one of the plurality of second recesses.

As further illustrated in FIGS. 1A and 1B, a plurality of dynamic target teeth 25 are coupled to a second portion of rotating shaft 22 for rotation therewith. Each of the plurality of dynamic target teeth 25 is positioned in proximity to first torque wheel 24 such that a comparison of the relative positions of the elements can be made. In the embodiment shown in FIGS. 1A and 1B, for example, dynamic target teeth 25 are each aligned within one of the plurality of first recesses in first torque wheel 24 (i.e., interleaved with one another). In any arrangement, whereas reference target teeth 27 are maintained at a fixed angular spacing with respect to second torque wheel 26, the plurality of dynamic target teeth 25 are configured to deflect with respect to first torque wheel 24 as a function of a torque applied to rotating shaft 22. In this regard, the spacing 28 between dynamic target teeth 25 and a respective edge of first torque wheel 24 can vary as the torque applied to rotating shaft 22 changes. By measuring this variance, measurement of a torque applied to rotating shaft 22 is obtained. Furthermore, concurrent measurement of the spacing of reference target teeth 27 with respect to second torque wheel 26 serves as a reference value against which the variance in spacing 28 between dynamic target teeth 25 and first torque wheel 26 can be compared. In this way, the variance attributable to twisting of rotating shaft 22 can be more precisely calculated, thereby filtering out other modes of movement. In other words, the calibration enabled by the comparison to the fixed positional relationship between reference target teeth 27 and second torque wheel 26 allows the system to eliminate the amplitude of the total movement of the system and focus on the phase shift alone.

Figure 2:
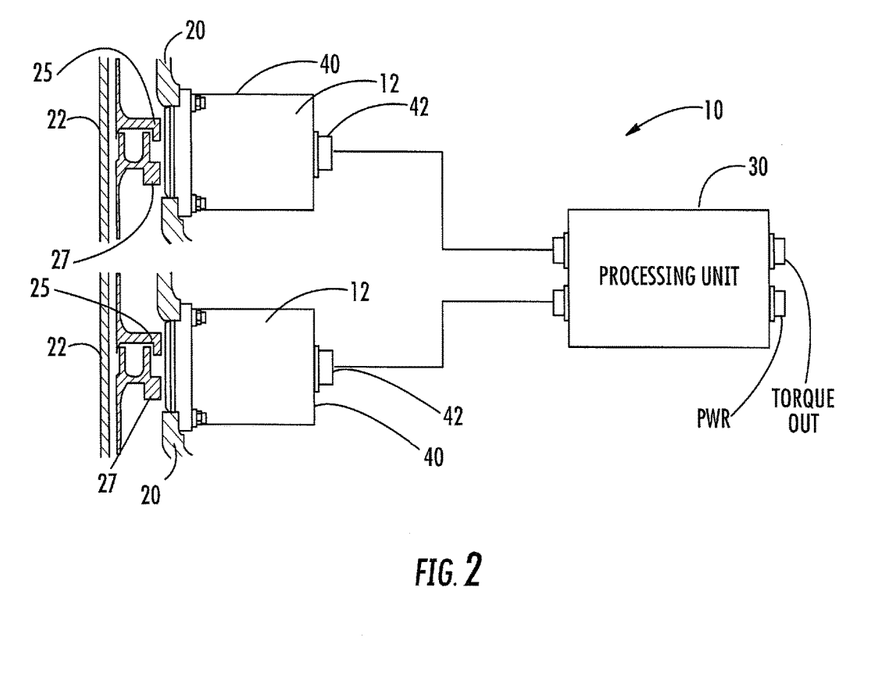
FIG. 2 illustrates a top-level schematic of a torquemeter according to an embodiment of the present subject matter.

To measure this relative deflection, torquemeter assembly 10 includes at least one transducer assembly 12. As illustrated in FIGS. 1A and 2, for example, transducer assembly 12 is attached to support structure 20 at a position such that it interfaces with one or both of first torque wheel 24 and/or second torque wheel 26 across a nominal air gap. From this position, transducer assembly 12 is able to measure the rotation of rotating shaft 22 by detecting the relative positions of dynamic target teeth 25 and first torque wheel 24. One or more transducer assemblies 12 are harnessed to processing unit 30. Processing unit 30 may be remotely located, or it may be functionally located proximate transducer assemblies 12. Furthermore, in some embodiments, processing unit 30 is in bi-directional electronic communication with a computer.

Figure 3A:
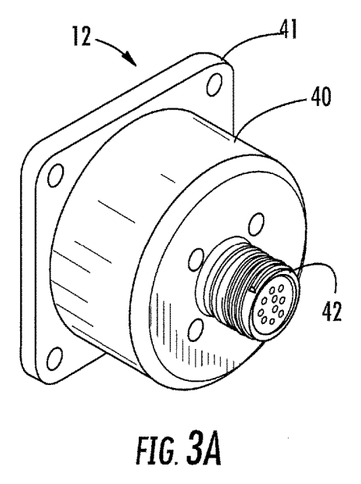
FIG. 3A is a perspective view of a transducer assembly according to an embodiment of the present subject matter.
Figure 3B:
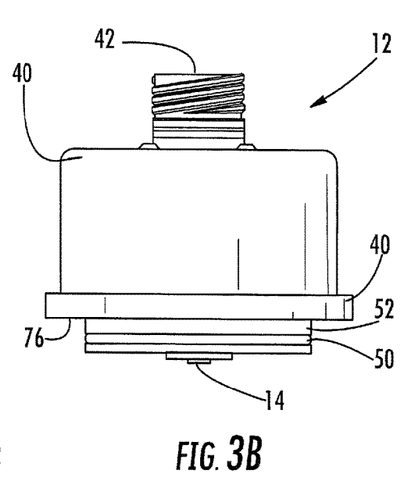
FIG. 3B is a first side view of a transducer assembly according to an embodiment of the present subject matter.
Figures 3C, 3D, 4:
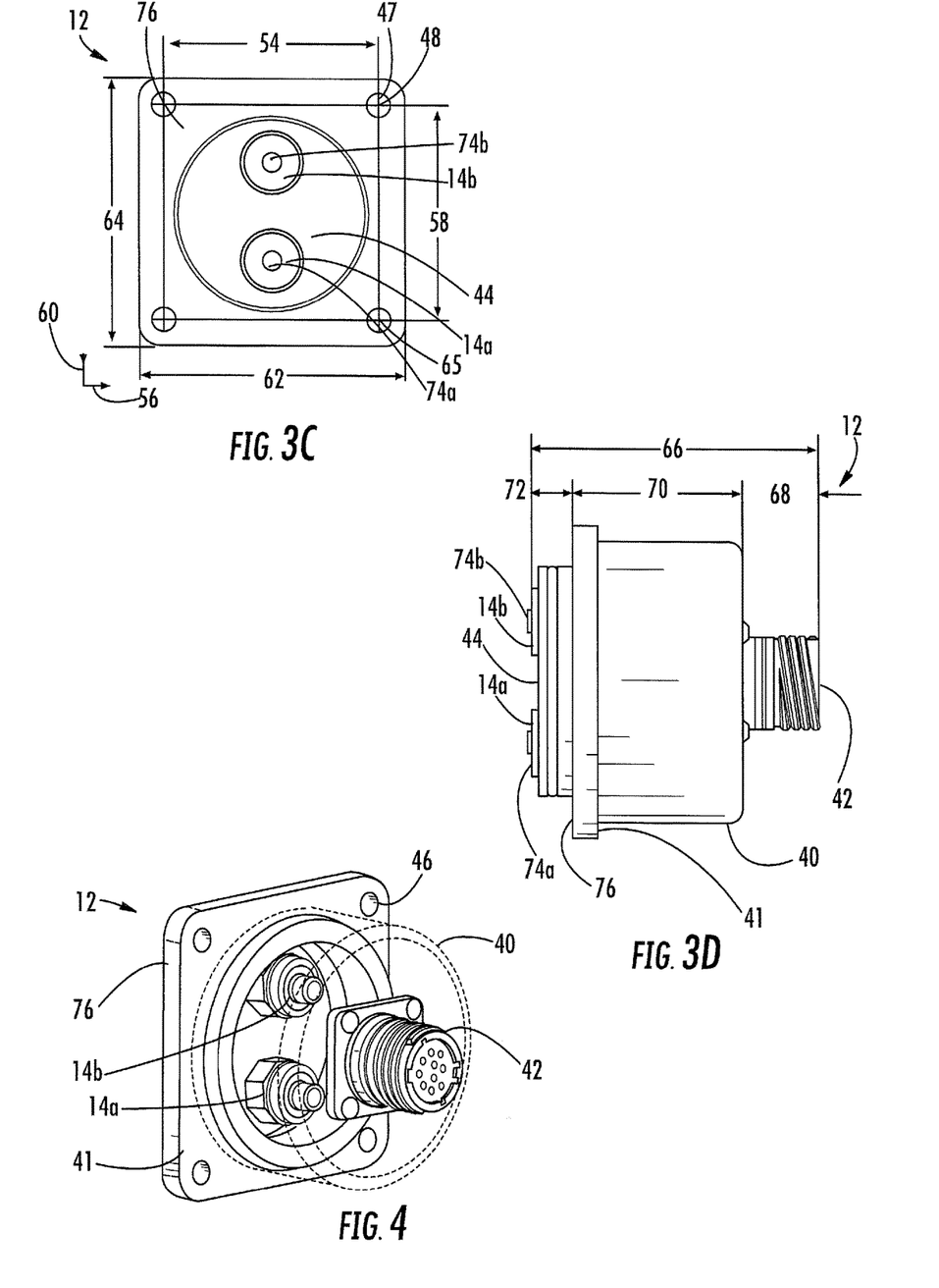
FIG. 3C is a bottom view of a transducer assembly according to an embodiment of the present subject matter.
FIG. 3D is a second side view of a transducer assembly according to an embodiment of the present subject matter.
FIG. 4 is a perspective view of a transducer assembly illustrating the use and position of internal VR sensors according to an embodiment of the present subject matter.

In particular, FIGS. 3A-3D illustrate a nominal design transducer assembly 12 shown in different perspectives with notional units of measurement. FIGS. 3A and 3B illustrate transducer assembly 12 from a perspective view and from a side view. FIG. 3C illustrates transducer assembly 12 from a bottom view. FIG. 3D illustrates transducer assembly 12 from another side view.

As shown in FIGS. 3A-4, in some embodiments, transducer assembly 12 includes at least one high-reliability variable reluctance (VR) sensor 14 encapsulated in an environmentally sealed housing 40. In some embodiments, for example, transducer assembly 12 includes a first VR sensor 14a having a first VR sensor end 74a and a second VR sensor 14b having a second VR sensor end 74b. In such an arrangement, each of first VR sensor 14a and second VR sensor 14b is associated with one of first torque wheel 24 or second torque wheel 26. Those having skill in the art will recognize that, although the present systems are discussed as using VR sensors, other kinds of sensors (e.g., Hall-effect sensors, optical systems) can be used in place of VR sensor 14 as long as they are capable of providing accurate measurements at the expected operating speeds of rotating shaft 22.

Referring to FIGS. 3A-3D, transducer assembly 12 is illustrated with housing 40 having mounting plate 41 and plug 42. In one embodiment housing 40 and mounting plate 41 are integrally formed together. In another embodiment, housing 40 and mounting plate 41 are secured together. In both embodiments, inner mount 44 is secured to mounting plate 41 and disposed within housing 40 such that inner mount 44 creates environmentally sealed space 46.

Referring to FIGS. 3C and 3D, inner mount 44 is illustrated with first and second VR sensors 14a and 14b disposed therethrough. Mounting plate 41 is illustrated with at least one mounting hole 47 having a mounting hole center 48.

Referring to FIGS. 3B and 3D, gasket 50 is illustrated positioned around outer edge 52 of inner mount 44. However, gasket 50 may be positioned in any location that provides environmental sealing of inner mount 44 where VR sensors 14 protrude therefrom.

Referring to FIGS. 3C and 3D, notional units of measurement are illustrated using reference characters. In a non-limiting example associated with FIG. 3C, hole spacing 54 represents the unit of measurement between mounting hole centers 48 along first axis 56 and hole spacing 58 represents the unit of measurement between mounting hole centers 48 along second axis 60. Outer dimension 62 in this non-limiting example represents the unit of measurement along first axis 56 and outer dimension 64 represents the unit of measurement along second axis 60. In the same non-limiting example associated with FIG. 3D, depth 66 represents the overall depth of transducer assembly 12. Plug height 68 represents a notional distance plug 42 extends outwardly from housing 40. Housing height 70 represents the height of housing 40 including mounting plate 41. Inner mount depth 72 represents the depth that the protruding portions of inner mount 44 (e.g., first and second VR sensors 14a and 14b, including first and second VR sensor ends 74a and 74b, and any other components extending therefrom) extend from mounting plate bottom 76. In a non-limiting example, these measurements are provided for one embodiment in Table 1 below:

TABLE 1

| Reference | Approximate Example Measurement |
| --- | --- |
| Hole spacing 54 | 60 mm |
| Hole spacing 58 | 60 mm |
| Outer dimension 62 | 75 mm |
| Outer dimension 64 | 75 mm |
| Depth 66 | 70 mm |
| Plug height 68 | 18 mm |
| Housing height 70 | 41 mm |
| Inner mount depth 72 | 11 mm |

Figure 5:
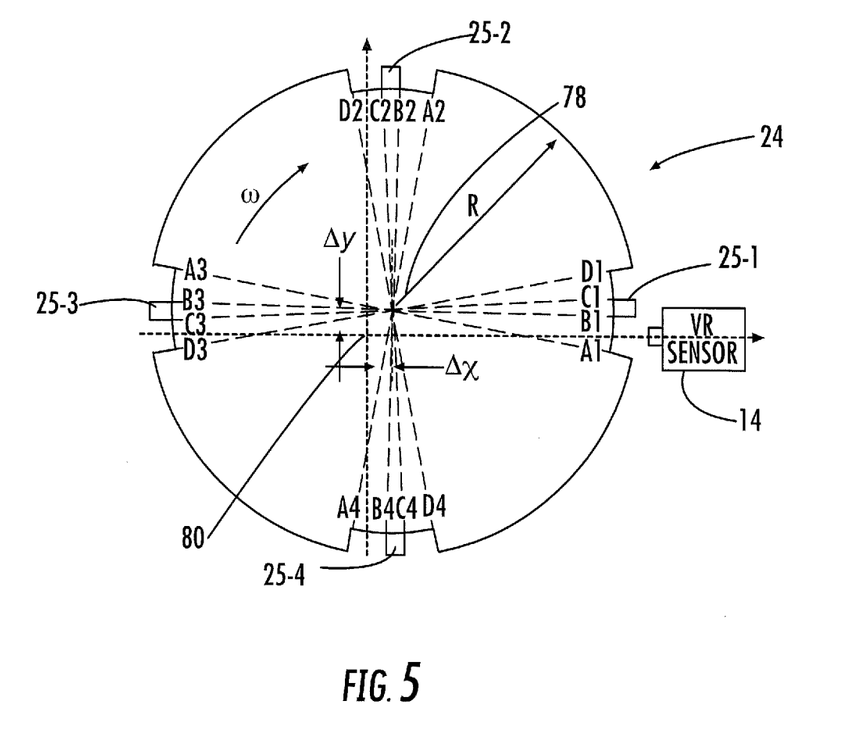
FIG. 5 illustrates a scale drawing of a torque wheel and the targets relative to the torque wheel according to an embodiment of the present subject matter.

Referring to FIGS. 4A-5, torquemeter assembly 10 is illustrated with two high-reliability VR sensors (i.e., first VR sensor 14a and second VR sensor 14b) positioned for interfacing with both first torque wheel 24 and second torque wheel 34 across a nominal air gap, which in this example has a width of about 1 mm. Although not shown, a RTD sensor can be associated with transducer assembly, either separately or within housing 40. The two VR sensors and any additional components (e.g., a RTD sensor) are packaged together within housing 40 that is environmentally sealed. All electronics within the transmitter, if any, are minimized in order to promote reliability.

Referring to FIG. 5, a schematic drawing of torque wheel 24 depicts four dynamic target teeth 25-1, 25-2, 25-3, and 25-4 relative to first torque wheel 24. Each of the four dynamic target teeth 25-1, 25-2, 25-3, and 25-4 are sequentially indexed from 1 to 4, and each of the edges are sequentially indexed with the letters A, B, C, and D. Relative to the view in FIG. 5, the entire rotating shaft 22 spins clockwise, resulting in the sequence: A1, B1, C1, D1, A2, B2, etc. At any point in time, it is not possible nor is it required to know absolute target location since only relative timing information is used.

In the example depicted in FIG. 5, center of rotation 78 of rotating shaft 22 is offset from its nominal center of rotation 80 by an amount of ($\Delta$x,$\Delta$y). In the example illustrated in FIG. 5, the following constraint applies for these time-varying deviations:

$$(\Delta x)^2 + (\Delta y)^2 \leq (1.0 \text{ mm})^2 \qquad (1)$$

VR sensor 14 is rigidly mounted along a radial line emanating from nominal center of rotation 80, shown as the x-axis in FIG. 5.

ILLUSTRATIVE EXAMPLE

Table 2 below illustrates some representative non-limiting example operating conditions used to explain the invention. Nothing in the illustrative example is intended to limit the scope of the invention.

Referring to Table 2, based upon radius R of first torque wheel 24 and using the shaft speed of rotating shaft 22 identified in column 1, the target velocity is determined and depicted in column 2. Target velocity is a parameter for sizing VR sensor 14. In the example used in Table 2, the specified target radius R is R=50.15 mm. The maximum and minimum shaft speeds are selected to illustrate the example.

TABLE 2

| Shaft Speed (RPM) | Target Velocity (m/s) | Comments |
| --- | --- | --- |
| 8000 | 42.013 | Maximum |
| 2500 | 13.129 | Minimum |

In order to achieve the desired angular twist resolution (i.e. the minimum measurable non-zero change in twist angle) in the example, a high-speed clock is used. For example, in some embodiments, the high-speed clock has a clock speed greater than 10.48 MHz. For the example, including a factor of safety, the clock rate is: $f_{clock}$=48 MHz.

Nominal (i.e., no-load) relative angular spacings of the edges A, B, C, and D are estimated. Combining this geometric information with the high-speed clock rate of the corresponding timing information in microseconds, and the number of high-speed clock counts for each of the angles is established.

The longest time duration that the counter measures is the portion of each rotational quadrant where the counter is waiting for the next set of target edges to arrive. This physical angle is called the "Quadrant Remainder". The longest time is associated with the lowest operational shaft speed. To support this maximum time, a high-speed counter must have at least 17 bits of resolution. The currently available number of bits for the counters in this application is 32 bits, but it is expected to grow with the capacity of computing power.

Figure 6:
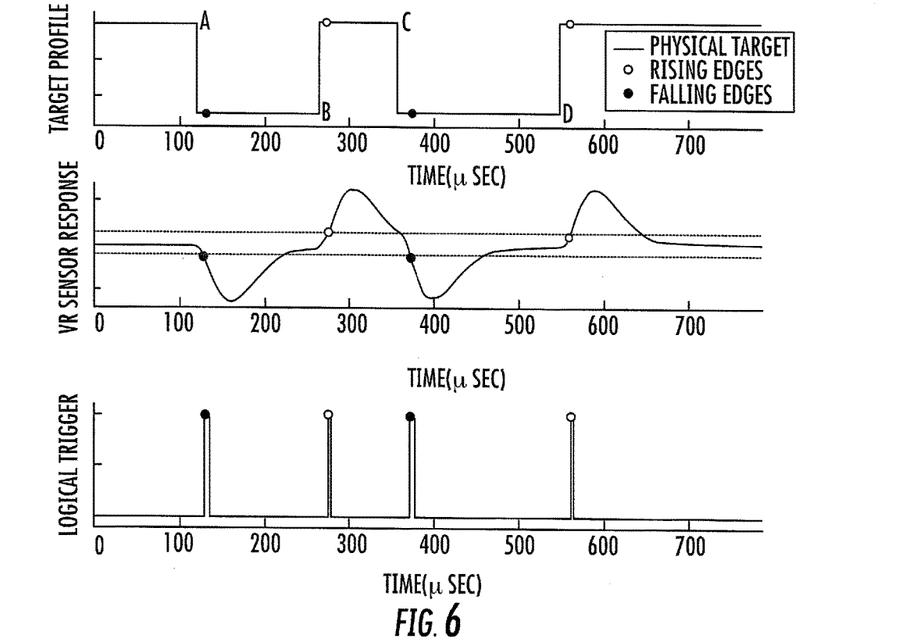
FIG. 6 is an example target profile and simulated VR sensor response according to an embodiment of the present subject matter.
Figure 7:
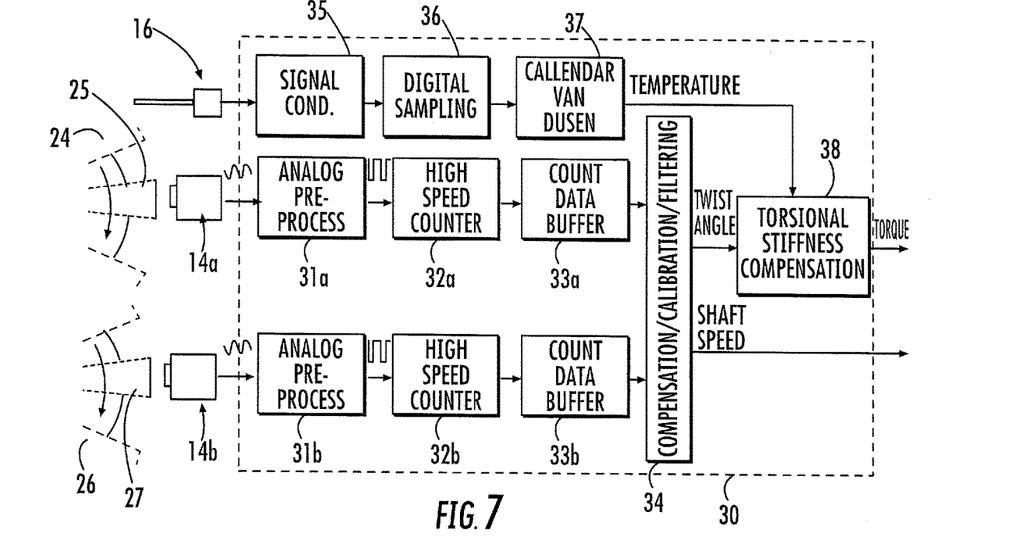
FIG. 7 is a high-level block diagram for twist processing using the present device and method of use.

Referring to FIGS. 6 and 7, edges A and C generate falling voltages in the response of VR sensor 14, whereas edges B and D generate rising voltages. FIG. 6 depicts an example simulated response for VR sensor 14 associated with a physical target model at 8000 RPM. Since the response of VR sensor 14 is nominally 0 volts, positive and negative threshold levels are used to trigger rising and falling edges, as indicated by the dashed horizontal lines in FIG. 6. Due to the dynamics of VR sensor 14, and the noise in the signal, the actual trigger points (shown as dots in FIG. 6) are always slightly delayed from the physical edge; however, the relative timing between rising and falling edges is consistent.

Regarding self-calibration, the torque wheel assembly has two sets of target teeth as discussed above. Specifically, dynamic target teeth 25 are radially movable relative the adjacent surfaces of first torque wheel 24 as a function of applied torque, whereas reference target teeth 27 are fixed to second torque wheel 26. In this way, in some embodiments, measurement of the timing at which the edges of second target wheel 26 and reference target teeth 27 pass a corresponding one of VR sensors 14 provides a real-time reference against which the timing of first torque wheel 24 and dynamic target teeth 25 can be compared. As a result, the radial movement of dynamic target teeth 25 relative to first torque wheel 24 that is attributable to the torque applied to rotating shaft 22 can be isolated. In this regard, reference target teeth 27 can be used during a calibration period prior to operational use as is done with conventional calibration systems, but the twist processing method of rotating shaft 22 effectively eliminates the need for such in situ calibration and in fact improves the overall accuracy of the twist measurement. It is noted, however, that these benefits come at the expense of an added sensor. That being said, VR sensors 14 are less expensive than the currently used Hall Sensors, and VR sensors 14 have very high reliability. As a result, the expense of additional sensors is at least partially mitigated by the use of lower cost, highly reliable sensors.

Referring to FIG. 7, a high-level functional block diagram of the torque-processing algorithm is depicted. As indicated, two VR sensors 14a and 14b are mounted over rotating shaft 22 and simultaneously pick up the locations of the features of first torque wheel 24, dynamic target teeth 25, second torque wheel 26, and reference target teeth 27. Each of these signals are processed and combined to provide a high-accuracy dynamic twist angle output to be used with a known torsional stiffness and temperature compensation to generate an actual torque output.

In particular, in the illustrated embodiment, first and second VR sensors 14a and 14b are in communication with first and second analog pre-processing blocks 31a and 31b, which represent the analog circuitry used to convert the analog VR response waveform (See, e.g., FIG. 6) into a transistor-transistor-logic-compatible (TTL) logic trigger signal. In some embodiments, this element also provides debounce capability to eliminate double hits and/or glitches due to noise.

A logical trigger signal is generated corresponding to both rising and falling edges as indicated in FIG. 5. To implement this function, pre-processing circuitry has positive and negative threshold levels, as well as the logic to generate a fixed duration pulse corresponding to each physical edge passing. This generates four logical pulses per target passage. In this regard, two high-speed counter blocks 32a and 32b (e.g., two independent high-speed modulo counters) are connected in communication with first and second analog pre-processing blocks 31a and 31b, respectively, and are configured to operate at the clock speed: $f_{clock}$. The counters are triggered from the rising edge of the logical trigger signal that is output from the corresponding analog pre-processor. Upon triggering, the current count value is stored. The count value automatically resets to zero when it overflows. Modulo arithmetic is required when processing the delta timing information. For example, referring to the configuration for first torque wheel 24 shown in FIG. 5 (and a similar configuration for second torque wheel 26), first and second high-speed counter blocks 32a and 32b output the current count value with the following sequence: . . . NA1, NB1, NC1, ND1, NA2, NB2, NC2, ND2, NA3, NB3, NC3, ND3, NA4, NB4, NC4, ND4 . . . .

In this example, there is no absolute angle reference, and as count data is obtained, there is no way of knowing which count is associated with which tooth passage. However, the Quadrant Remainder count is always significantly larger than any of the other counts in the stream so it may be isolated in the manner shown hereinafter.

With continuing reference to FIG. 7, first and second count data buffers 33a and 33b connected in communication with first and second high-speed counter blocks 32a and 32b are configured to store the count data streams from first and second high-speed counter blocks 32a and 32b. For example, in some embodiments, first and second count data buffers 33a and 33b are two independent circular buffers with 16 elements to capture all data associated with one complete revolution. The individual count data from each VR sensor 14 will approximately arrive simultaneously. The group of counts associated with each target will be generated at a rate of 4/rev which is 533.33 Hz @ 8000 RPM. An example set of circular buffers looks like:

$$\text{dyn\_circ\_buf} = \begin{bmatrix} N_{A1}^{dyn} \\ N_{B1}^{dyn} \\ N_{C1}^{dyn} \\ N_{D1}^{dyn} \\ N_{A2}^{dyn} \\ N_{B2}^{dyn} \\ N_{C2}^{dyn} \\ N_{D2}^{dyn} \\ N_{A3}^{dyn} \\ N_{B3}^{dyn} \\ N_{C3}^{dyn} \\ N_{D3}^{dyn} \\ N_{A4}^{dyn} \\ N_{B4}^{dyn} \\ N_{C4}^{dyn} \\ N_{D4}^{dyn} \end{bmatrix} \quad (2)$$

$$\text{sim\_circ\_buf} = \begin{bmatrix} N_{A1}^{sim} \\ N_{B1}^{sim} \\ N_{C1}^{sim} \\ N_{D1}^{sim} \\ N_{A2}^{sim} \\ N_{B2}^{sim} \\ N_{C2}^{sim} \\ N_{D2}^{sim} \\ N_{A3}^{sim} \\ N_{B3}^{sim} \\ N_{C3}^{sim} \\ N_{D3}^{sim} \\ N_{A4}^{sim} \\ N_{B4}^{sim} \\ N_{C4}^{sim} \\ N_{D4}^{sim} \end{bmatrix}$$

As mentioned above, there is no means for determining which of the sixteen edges triggers first. Once each circular buffer has completely filled, a startup process will scan through the changes in count value from element to element. As indicated in Table X, the changes in count value in each circular buffer will always consist of three relatively short incremental count values followed by one relatively long incremental count value. For example, at 8000 rpm, and using the approximate data from Table X, a typical count sequence might result in:

$$\vdots \\ \mod(N_{B1} - N_{A1}) = 3991 \quad \text{short} \\ \mod(N_{C1} - N_{B1}) = 1996 \quad \text{short} \\ \mod(N_{D1} - N_{C1}) = 2993 \quad \text{short} \\ \mod(N_{A2} - N_{D1}) = 30321 \quad \text{long} \\ \mod(N_{B2} - N_{A2}) = 3991 \quad \text{short} \\ \vdots \tag{3}$$

Once the long (i.e. "Quadrant Remainder") interval is identified from the delta count values, the relative positions of all other edges are established. Only four sequential delta count values are required to establish alignment. The startup process runs separately for each of the two circular buffers because it is possible for one of the circular buffers to be advanced or delayed by one sample. Once the Quadrant Remainder is identified in each circular buffer, the data streams are properly aligned. As shown in FIG. 7, for example, first and second count data buffers 33a and 33b are further in communication with a compensation/calibration/filtering block 34, which performs the continuous self-calibration of the counter data streams, including appropriate filtering.

The count data from second torque wheel 26 is generated from rising and/or falling edges having no relative motion (i.e., reference target teeth 27 have fixed angular spacing with respect to second torque wheel 26). This means that the relative timing, when combined with the measured rotating shaft speed, will result in fixed and known angular positions. Similarly, half of the count data coming from dynamic target teeth 25 are generated from rising and falling edges that have no relative motion. Only the rising and falling edges of dynamic target teeth 25 vary relative to the other edges.

Dynamic vibrations of rotating shaft 22, shaft whirl, and low-frequency flexing of support structure 20 may cause non-zero time-varying displacements from the nominal center of rotation 80, i.e. $\Delta x(t) \neq 0$, and $\Delta y(t) \neq 0$. Such displacements have a clear impact on not only the gap between the target and the VR sensor, but also on the edge timing measurements. Rather than simply "filter" these effects in an attempt to eliminate them, the presently-disclosed systems and methods directly accommodate this time-varying distortion. Specifically, for example, although the rotating shaft speed is generally time-varying, it is assumed to be constant over any single shaft revolution. In addition, over one quarter revolution of the shaft, the dynamic variation is assumed to be constant (i.e., $\Delta x(t) \approx$ constant, and $\Delta y(t) \approx$ constant). Thus, although the dynamic variations can and will be time varying, they can be assumed to be constant over any quarter revolution. This assumption is based on the knowledge that $\Delta x(t)$ and $\Delta y(t)$ have spectral contents that are restricted between DC and the fundamental rotating shaft 22 rotational frequency.

In some embodiments, a further function of compensation/calibration/filtering block 34 is edge-to-edge angular compensation. Because all of reference target teeth 27 associated with second torque wheel 26 have no relative angular movement, and half of the edges on first torque wheel 24 likewise have no relative angular movement, the following angles (edges) nearest to the $i^{th}$ target are always fixed and known:

$\theta_{CB} = \theta_{Ci} - \theta_{Bi}$ one tooth
$\theta_{DA} = \theta_{Di} - \theta_{Ai}$ overall notch
$\theta_{AD} = \theta_{Ai} - \theta_{D,i-1}$ previous quadrant remainder
$\theta_{AA} = \theta_{Ai} - \theta_{A,i-1}$ quarter revolution from previous A edge
$\theta_{DD} = \theta_{Di} - \theta_{D,i-1}$ quarter revolution from previous D edge The following additional angles are also fixed and known on simulated target torque wheel 34:

$\theta_{BA} = \theta_{Bi} - \theta_{Ai}$ notch prior to tooth (falling→rising)
$\theta_{CA} = \theta_{Ci} - \theta_{Ai}$ falling edge to falling edge (falling→falling)
$\theta_{DB} = \theta_{Di} - \theta_{Bi}$ rising edge to rising edge (rising→rising)
$\theta_{DC} = \theta_{Di} - \theta_{Ci}$ notch following tooth (falling→rising)

Using data from first and second count data buffers 33a and 33b, uncompensated estimates of the fixed angles are computed as:

$$\tilde{\theta}_{CBi} = \frac{[\mod(N_{Ci} - N_{Bi})(\text{counts})]}{cpd\left(\frac{\text{counts}}{\text{degree}}\right)}$$

$$\tilde{\theta}_{BAi} = \frac{[\mod(N_{Bi} - N_{Ai})(\text{counts})]}{cpd\left(\frac{\text{counts}}{\text{degree}}\right)}$$

$$\tilde{\theta}_{DAi} = \frac{[\mod(N_{Di} - N_{Ai})(\text{counts})]}{cpd\left(\frac{\text{counts}}{\text{degree}}\right)}$$

$$\tilde{\theta}_{CAi} = \frac{[\mod(N_{Ci} - N_{Ai})(\text{counts})]}{cpd\left(\frac{\text{counts}}{\text{degree}}\right)}$$

$$\tilde{\theta}_{ADi} = \frac{[\mod(N_{Ai} - N_{D,i-1})(\text{counts})]}{cpd\left(\frac{\text{counts}}{\text{degree}}\right)}$$

$$\tilde{\theta}_{DBi} = \frac{[\mod(N_{Di} - N_{Bi})(\text{counts})]}{cpd\left(\frac{\text{counts}}{\text{degree}}\right)}$$

$$\tilde{\theta}_{AAi} = \frac{[\mod(N_{Ai} - N_{A,i-1})(\text{counts})]}{cpd\left(\frac{\text{counts}}{\text{degree}}\right)}$$

$$\tilde{\theta}_{DCi} = \frac{[\mod(N_{Di} - N_{Ci})(\text{counts})]}{cpd\left(\frac{\text{counts}}{\text{degree}}\right)}$$

$$\tilde{\theta}_{DDi} = \frac{[\mod(N_{Di} - N_{D,i-1})(\text{counts})]}{cpd\left(\frac{\text{counts}}{\text{degree}}\right)}$$

These estimates will not match the fixed known angles due to the deviations of center of rotation 80 described above. The fixed angle estimation errors can be computed for each tooth passage as:

$\epsilon_{CBi} = (\theta_{CB})_{actual} - \tilde{\theta}_{CBi}$ $\epsilon_{BAi} = (\theta_{BA})_{actual\text{-}sim} - \tilde{\theta}_{BAi}$
$\epsilon_{DAi} = (\theta_{DA})_{actual} - \tilde{\theta}_{DAi}$ $\epsilon_{CAi} = (\theta_{CA})_{actual\text{-}sim} - \tilde{\theta}_{CAi}$
$\epsilon_{ADi} = (\theta_{AD})_{actual} - \tilde{\theta}_{ADi}$ $\epsilon_{DBi} = (\theta_{DB})_{actual\text{-}sim} - \tilde{\theta}_{DBi}$
$\epsilon_{AAi} = (\theta_{AA})_{actual} - \tilde{\theta}_{AAi}$ $\epsilon_{DCi} = (\theta_{DC})_{actual\text{-}sim} - \tilde{\theta}_{DCi}$
$\epsilon_{DDi} = (\theta_{DD})_{actual} - \tilde{\theta}_{DDi}$ The following relationships are true for the estimation errors:

$\epsilon_{DBi} = \epsilon_{CBi} + \epsilon_{DCi}$ $\epsilon_{CAi} = \epsilon_{BAi} + \epsilon_{CBi}$ $\epsilon_{DAi} = \epsilon_{DBi} + \epsilon_{DBi} = \epsilon_{DCi} + \epsilon_{CAi}$ These errors are not dependent on the torque or the resulting twist angle, but instead they are dependent on dynamic displacements Δx(t) and Δy(t) as well as temperature. The estimation errors from the simulated targets are then used to compensate the measurements from the dynamic targets to produce compensated dynamic angles:

$(\theta_{BAi})_{comp} = \tilde{\theta}_{BAi} + \epsilon_{BAi}$
$(\theta_{CAi})_{comp} = \tilde{\theta}_{CAi} + \epsilon_{CAi}$
$(\theta_{DBi})_{comp} = \tilde{\theta}_{DBi} + \epsilon_{DBi}$
$(\theta_{DCi})_{comp} = \tilde{\theta}_{DCi} + \epsilon_{DCi}$ In some embodiments, another function of compensation/calibration/filtering block 34 is computation of a shaft speed. Both the calibration and compensation processing require an accurate speed measurement of rotating shaft 22 to transform the count data to geometric dimensions.

$$\text{cpd\_buf} = [\ ]\left(\frac{\text{counts}}{\text{degree}}\right)$$

In addition, in some embodiments, compensation/calibration/filtering block 34 is configured to calibrate the twist angle. In particular, each of the compensated dynamic angle estimates is related to the actual twist angle. The compensated angles must be "zeroed" using a calibration offset. Each of the four terms will have a different calibration offset because they are physically different angles.

$(\theta_{BAi})_{cal} = (\theta_{BAi})_{comp} + \phi_{BA}$
$(\theta_{CAi})_{cal} = (\theta_{CAi})_{comp} + \phi_{CA}$
$(\theta_{DBi})_{cal} = (\theta_{DBi})_{comp} + \phi_{DB}$
$(\theta_{DCi})_{cal} = (\theta_{DCi})_{comp} + \phi_{DC}$ Where $\{\phi_{BA}, \phi_{CA}, \phi_{DB}, \phi_{DC}\}$ are calibration constants chosen such that at zero torque, each of the four calibrated twist angle estimates above will have a value of zero (degrees). Second torque wheel 26 provides a continuous measurement of the twist due to a known torque of 120 m·daN. This simulated torque, when combined with torsional stiffness data, provides an absolute reference twist angle from which the calibration constants can be determined.

The twist angle associated with the $i^{th}$ dynamic target is then computed as the following average:

$\theta_{twist,i} = \frac{1}{4}((\theta_{BAi})_{cal} + (\theta_{DCi})_{cal} + (\theta_{DBi})_{cal} + (\theta_{CAi})_{cal})$ One averaged dynamic twist estimate will be generated for each tooth passage.

Referring again to compensation/calibration/filtering block 34, the dynamic twist angle $\theta_{twist,i}$ samples will be filtered using a comb filter to eliminate harmonics of 1/rev caused by manufacturing tolerance variation and vibration or shaft whirl effects relative to VR sensors 14, as well as a 15 Hz low-pass filter to restrict the bandwidth and provide an anti-aliasing function.

As indicated above, in addition to VR sensors 14, in some embodiments, torquemeter 10 further includes a RTD sensor 16 configured to measure the temperature of environment in which VR sensors 14 are operating. In such embodiments, RTD sensor 16 is in communication with elements of processor 30, including a signal-conditioning element 35, a digital sampling element 36, and a Callendar-Van Dusen element 37. In some embodiments, the output from this signal processing is a temperature value that is provided to a torsional stiffness compensation block 38 that is further in communication with compensation/calibration/filtering block 34. The torsional stiffness has a known variation with temperature that is characterized and defined in the software. Each rotating shaft has a unique set of torsional stiffness data that varies with temperature. This data is processed with the measured temperature and the measured dynamic twist angle to produce the torque measurement.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A non-contacting torquemeter comprising:
a torque wheel assembly configured for coupling to a first portion of a rotating shaft for rotation with the rotating shaft;
a plurality of dynamic target teeth configured for coupling to a second portion of the rotating shaft for rotation with the rotating shaft, wherein the plurality of dynamic target teeth are configured to deflect with respect to the torque wheel assembly as a function of a torque applied to the rotating shaft;
a transducer assembly including at least one sensor separated from the torque wheel assembly by a gap and configured to measure a position and speed of the torque wheel assembly and the plurality of dynamic target teeth, wherein the at least one sensor further comprises:
a first sensor separated from the torque wheel assembly by a first gap and configured to measure a position and speed of the dynamic target teeth relative to the torque wheel assembly;
a second sensor separated from the torque wheel assembly by a second gap and configured to measure a position and speed of a reference portion of the torque wheel assembly; and
a processing unit in communication with the transducer assembly and configured to determine the torque applied to the rotating shaft based on the position and speed measured by the transducer assembly.

2. The non-contacting torquemeter of claim 1, wherein the torque wheel assembly comprises:
a first torque wheel having a plurality of first recessed sections in an outer edge of the first torque wheel, the plurality of first recessed sections being spaced about the perimeter of the first torque wheel;
a second torque wheel having a plurality of second recessed sections in an outer edge of the second torque wheel, the plurality of second recessed sections being spaced about the perimeter of the second torque wheel; and
a plurality of reference target teeth each positioned within one of the plurality of second recessed sections.

3. The non-contacting torquemeter of claim 2, wherein each of the plurality of dynamic target teeth are aligned within one of the plurality of first recessed sections in the first torque wheel.

4. The non-contacting torquemeter of claim 2, wherein the first torque wheel, the second torque wheel, and the plurality of reference target teeth are integrated together as a single component configured for rotation with the rotating shaft.

5. The non-contacting torquemeter of claim 2, wherein the first torque wheel comprises a first substantially disc-shaped element configured to be arranged substantially coaxially with the rotating shaft; and wherein the second torque wheel comprises a second substantially disc-shaped element configured to be arranged substantially coaxially with the rotating shaft and axially spaced from the first torque wheel.

6. The non-contacting torquemeter of claim 1, wherein the at least one sensor comprises at least one variable reluctance sensor.

7. The non-contacting torquemeter of claim 1, wherein the at least one sensor are substantially encapsulated within a housing.

8. The non-contacting torquemeter of claim 1, comprising at least one resistance temperature detector in communication with the processing unit and positioned to measure a temperature at or near the transducer assembly.

9. A non-contacting torquemeter comprising:
a shaft rotatable about an axis;
a torque wheel assembly configured for coupling to a first portion of the shaft for rotation with the shaft, the torque wheel assembly comprising;
   a first torque wheel having a plurality of first recessed sections in an outer edge of the first torque wheel, the plurality of first recessed sections being spaced about the perimeter of the first torque wheel:
   a second torque wheel having a plurality of second recessed sections in an outer edge of the second torque wheel, the plurality of second recessed sections being spaced about the perimeter of the second torque wheel; and
   a plurality of reference target teeth each positioned within one of the plurality of second recessed sections;
a plurality of dynamic target teeth coupled to a second portion of the shaft for rotation with the shaft, wherein each of the plurality of dynamic target teeth are aligned within one of the plurality of first recessed sections in the first torque wheel, and wherein the plurality of dynamic target teeth are configured to deflect with respect to the first torque wheel as a function of a torque applied to the rotating shaft;
a transducer assembly including at least one sensor separated from one of the first torque wheel or the second torque wheel by a gap and configured to measure a position and speed of the one of the first torque wheel and plurality of dynamic target teeth or the second torque wheel and plurality of reference target teeth;
a processing unit in communication with the transducer assembly and configured to determine the torque applied to the shaft based on the position and speed measured by the transducer assembly.
at least one resistance temperature detector in communication with the processing unit and positioned to measure a temperature at or near the transducer assembly.

10. The non-contacting torquemeter of claim 9, wherein the at least one sensor comprises at least one variable reluctance sensor.

11. The non-contacting torquemeter of claim 9, wherein the at least one sensor comprises:
a first sensor separated from the first torque wheel by a first gap and configured to measure a position and speed of the dynamic target teeth relative to the first torque wheel; and
a second sensor separated from the second torque wheel by a second gap and configured to measure a position and speed of the reference target teeth relative to the second torque wheel.

12. A method for measuring a torque on a rotating shaft, the method comprising:
measuring a position of a dynamic target relative to a torque wheel assembly, wherein the torque wheel assembly is coupled to a first portion of a rotating shaft for rotation with the rotating shaft, wherein the dynamic target is coupled to a second portion of the rotating shaft for rotation with the rotating shaft, and wherein the dynamic target is configured to deflect with respect to the torque wheel assembly as a function of a torque applied to the rotating shaft;
measuring a position of a reference target that is fixed in rotation with respect to the torque wheel assembly;
comparing the position of the dynamic target relative to the torque wheel assembly to the position of the reference target relative to the torque wheel assembly; and
determining a torque applied to the rotating shaft based on a difference between the position of the dynamic target relative to the torque wheel assembly to the position of the reference target relative to the torque wheel assembly.

13. The method of claim 12, wherein measuring a position of a dynamic target relative to a torque wheel assembly comprises receiving an input from a first sensor positioned proximal to the torque wheel assembly; and wherein measuring a position of a reference target relative to the torque wheel assembly comprises receiving an input from a second sensor positioned proximal to the torque wheel assembly.

14. The method of claim 13, wherein the first sensor comprises a first variable reluctance sensor, and receiving an input from a first sensor comprises receiving a first timing between logical triggers associated with a voltage response from the first variable reluctance sensor; and wherein the second sensor comprises a second variable reluctance sensor, and receiving an input from a second sensor comprises receiving a second timing between logical triggers associated with a voltage response from the second variable reluctance sensor.

15. The method of claim 14, wherein measuring a position of a dynamic target relative to a torque wheel assembly comprises converting the voltage response from the first variable reluctance sensor into a first TTL-compatible logic trigger; and wherein measuring a position of a reference target relative to the torque wheel assembly comprises converting the voltage response from the second variable reluctance sensor into a second TTL-compatible logic trigger.

16. The method of claim 12, wherein determining a torque applied to the rotating shaft comprises compensating for a torsional stiffness of the rotating shaft based on a known temperature response of the rotating shaft.

17. a temperature measurement from a temperature sensor positioned proximal to the torque wheel assembly.

18. The method of claim 12, comprising determining a speed of the rotating shaft based on one of the position of the dynamic target relative to the torque wheel assembly or the position of the reference target relative to the torque wheel assembly.

19. A non-contacting torquemeter comprising:
a torque wheel assembly configured for coupling to a first portion of a rotating shaft for rotation with the rotating shaft;
a plurality of dynamic target teeth configured for coupling to a second portion of the rotating shaft for rotation with the rotating shaft, wherein the plurality of dynamic target teeth are configured to deflect with respect to the torque wheel assembly as a function of a torque applied to the rotating shaft;
a transducer assembly including at least one sensor separated from the torque wheel assembly by a gap and configured to measure a position and speed of the torque wheel assembly and the plurality of dynamic target teeth a processing unit in communication with the transducer assembly and configured to determine the torque applied to the rotating shaft based on the position and speed measured by the transducer assembly; and at least one resistance temperature detector in communication with the processing unit and positioned to measure a temperature at or near the transducer assembly.

20. A non-contacting torquemeter comprising:

a shaft rotatable about an axis;

a torque wheel assembly configured for coupling to a first portion of the shaft for rotation with the shaft, the torque wheel assembly comprising;

a first torque wheel having a plurality of first recessed sections in an outer edge of the first torque wheel, the plurality of first recessed sections being spaced about the perimeter of the first torque wheel:

a second torque wheel having a plurality of second recessed sections in an outer edge of the second torque wheel, the plurality of second recessed sections being spaced about the perimeter of the second torque wheel; and a plurality of reference target teeth each positioned within one of the plurality of second recessed sections;

a plurality of dynamic target teeth coupled to a second portion of the shaft for rotation with the shaft, wherein each of the plurality of dynamic target teeth are aligned within one of the plurality of first recessed sections in the first torque wheel, and wherein the plurality of dynamic target teeth are configured to deflect with respect to the first torque wheel as a function of a torque applied to the rotating shaft;

a transducer assembly including at least one sensor separated from one of the first torque wheel or the second torque wheel by a gap and configured to measure a position and speed of the one of the first torque wheel and plurality of dynamic target teeth or the second torque wheel and plurality of reference target teeth, wherein the at least one sensor further comprises:

a first sensor separated from the first torque wheel by a first gap and configured to measure a position and speed of the dynamic target teeth relative to the first torque wheel;

a second sensor separated from the second torque wheel by a second gap and configured to measure a position and speed of the reference target teeth relative to the second torque wheel; and a processing unit in communication with the transducer assembly and configured to determine the torque applied to the shaft based on the position and speed measured by the transducer assembly.

* * * * *